(12) United States Patent
Hirose

(10) Patent No.: US 10,773,992 B2
(45) Date of Patent: Sep. 15, 2020

(54) CERAMIC POWDER, COMPOSITE POWDER MATERIAL, AND SEALING MATERIAL

(71) Applicant: Nippon Electric Glass Co., Ltd., Otsu-shi, Shiga (JP)

(72) Inventor: Masayuki Hirose, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 25 days.

(21) Appl. No.: 16/094,021

(22) PCT Filed: Apr. 7, 2017

(86) PCT No.: PCT/JP2017/014578
§ 371 (c)(1),
(2) Date: Oct. 16, 2018

(87) PCT Pub. No.: WO2017/183490
PCT Pub. Date: Oct. 26, 2017

(65) Prior Publication Data
US 2019/0127266 A1    May 2, 2019

(30) Foreign Application Priority Data

Apr. 21, 2016 (JP) ................ 2016-085030
Apr. 21, 2016 (JP) ................ 2016-085031

(51) Int. Cl.
*C03C 8/24* (2006.01)
*C03C 8/04* (2006.01)
*C04B 35/19* (2006.01)
*C04B 35/14* (2006.01)

(52) U.S. Cl.
CPC ............ *C03C 8/24* (2013.01); *C03C 8/04* (2013.01); *C04B 35/14* (2013.01); *C04B 35/19* (2013.01);
(Continued)

(58) Field of Classification Search
CPC ... C03C 8/24; C03C 2204/00; C03C 2205/00; C03C 14/004; C04B 35/14; C04B 35/19;
(Continued)

(56) References Cited

U.S. PATENT DOCUMENTS 4,515,897 A * 5/1985 Sack .................. C03C 8/24
501/15
6,521,556 B2 * 2/2003 Shindo .............. C03C 10/0027
501/4
(Continued)

FOREIGN PATENT DOCUMENTS

JP    59-174543    10/1984
JP    63-315536    12/1988
(Continued)

OTHER PUBLICATIONS

International Search Report dated Jul. 4, 2017 in International Application No. PCT/JP2017/014578.
(Continued)

*Primary Examiner* — Noah S Wiese
(74) *Attorney, Agent, or Firm* — Wenderoth, Lind & Ponack, L.L.P.

(57) ABSTRACT

Provided is a ceramic powder having precipitated therein β-eucryptite or a β-quartz solid solution as a main crystal phase, having an average particle diameter $D_{50}$ of 20 μm or less, and having a negative thermal expansion coefficient in a range of from 30° C. to 300° C.

7 Claims, 2 Drawing Sheets

(52) U.S. Cl.
CPC ...... *C03C 2204/00* (2013.01); *C03C 2205/00* (2013.01); *C04B 2235/3203* (2013.01); *C04B 2235/3217* (2013.01); *C04B 2235/3232* (2013.01); *C04B 2235/3244* (2013.01); *C04B 2235/3418* (2013.01); *C04B 2235/3472* (2013.01); *C04B 2235/36* (2013.01); *C04B 2235/5436* (2013.01); *C04B 2235/5454* (2013.01)

(58) Field of Classification Search
CPC .... C04B 2235/3217; C04B 2235/3203; C04B 2235/5436; C04B 2235/3232; C04B 2235/3244; C04B 2235/3472
See application file for complete search history.

(56) References Cited

U.S. PATENT DOCUMENTS

| | | | |
|---|---|---|---|
| 8,980,776 B2* | 3/2015 | Hamada | .................. C03C 3/066 501/14 |
| 2002/0045527 A1 | 4/2002 | Shindo et al. | |
| 2002/0058578 A1 | 5/2002 | Shindo | |
| 2013/0090226 A1 | 4/2013 | Hamada | |

FOREIGN PATENT DOCUMENTS

| | | |
|---|---|---|
| JP | 8-59294 | 3/1996 |
| JP | 2001-172048 | 6/2001 |
| JP | 2002-104841 | 4/2002 |
| JP | 2012-12231 | 1/2012 |
| JP | 2012-229131 | 11/2012 |
| KR | 2012-0131703 | 12/2012 |

OTHER PUBLICATIONS

International Preliminary Report on Patentability dated Oct. 23, 2018 in International Application No. PCT/JP2017/014578.
Office Action and Search Report dated Apr. 24, 2020 in corresponding Taiwanese Patent Application 106112336, with English translation of the Taiwanese Search Report.

* cited by examiner

CERAMIC POWDER, COMPOSITE POWDER MATERIAL, AND SEALING MATERIAL

TECHNICAL FIELD

The present invention relates to a ceramic powder, a composite powder material, and a sealing material.

BACKGROUND ART

In general, a composite powder material including glass powder and ceramic powder is used as a sealing material. This sealing material is excellent in chemical durability and heat resistance and suitable for securing airtightness as compared to a resin-based adhesive.

For example, high-expansion and low-melting-point glass, such as PbO-based glass or $Bi_2O_3$-based glass, is used as the glass powder for sealing (see, for example, Patent Literatures 1 and 2).

In addition, the sealing material is used for sealing of a low-expansion substrate, such as an alumina substrate or a glass substrate. In this case, when the sealing material has an excessively high thermal expansion coefficient, there is a risk in that inappropriate residual strain is caused in a sealing layer or the low-expansion substrate after the sealing, and cracks occur in the sealing layer or the low-expansion substrate, resulting in hermetic leakage or the like. Therefore, when an object to be sealed has a lower expansion coefficient than that of the sealing material, it is important to reduce the thermal expansion coefficient of the sealing material. In particular, when $Bi_2O_3$-based glass is used as the glass powder, a reduction in thermal expansion coefficient of the $Bi_2O_3$-based glass is naturally limited, and hence it is important to reduce the thermal expansion coefficient of the ceramic powder.

In view of the foregoing, when negative-expansion ceramic powder is used, the thermal expansion coefficient of the sealing material can be effectively reduced. It is known that the ceramic powder expresses negative expansion through microcracks in a crystal grain boundary resulting from anisotropic expansion of crystal grains.

CITATION LIST

Patent Literature 1: JP 63-315536 A
Patent Literature 2: JP 08-59294 A

SUMMARY OF INVENTION

Technical Problem

Incidentally, the thickness of the sealing layer is designed depending on applications. In recent years, the thickness of the sealing layer has been designed to be small in some cases. For example, in the case of laser sealing (sealing through laser light irradiation), when the sealing layer has a small thickness, a laser sealing property can be remarkably enhanced. In addition, when the sealing layer has a small thickness, such sealing layer can contribute to reductions in height and size of a hermetic package.

In order to reduce the thickness of the sealing layer, the particle diameter of the ceramic powder in the sealing material needs to be reduced. However, when the particle diameter of the negative-expansion ceramic powder is reduced, the number of microcracks in the crystal grain boundary is reduced, and the thermal expansion coefficient of the ceramic powder is increased. As a result, the ceramic powder does not sufficiently express negative expansion, and it becomes difficult to appropriately reduce the thermal expansion coefficient of the sealing material.

Meanwhile, when the thermal expansion coefficient of the glass powder is reduced, the thermal expansion coefficient of the sealing material is reduced. In this case, the glass powder is difficult to soften and deform, and hence a laser output needs to be increased at the time of laser sealing, with the result that cracks are liable to occur in the object to be sealed or the sealing layer during the laser sealing. In particular, $Bi_2O_3$-based glass powder has the following property: it is difficult to reduce the thermal expansion coefficient of the $Bi_2O_3$-based glass powder without an improper increase in its softening point.

A first technical object of the present invention is to devise a ceramic powder which exhibits negative expansion even when having a small particle diameter.

In addition, a second technical object of the present invention is to devise a sealing material capable of achieving both a low expansion coefficient and a low softening point even when a sealing thickness is reduced, and a composite powder material suitable for the sealing material.

Solution to Problem

As a result of extensive efforts, the inventor of the present invention has found that the above-mentioned first technical object can be achieved by adopting a lithium aluminosilicate-based (hereinafter referred to as "LAS-based") ceramic powder comprising β-eucryptite or a β-quartz solid solution as a main crystal phase. Thus, the finding is proposed as the present invention. That is, according to one embodiment of the present invention, there is provided a ceramic powder having precipitated therein β-eucryptite or a β-quartz solid solution as a main crystal phase (crystal having the largest precipitation amount), and having a negative thermal expansion coefficient in a range of from 30° C. to 300° C. The "thermal expansion coefficient in a range of from 30° C. to 300° C." may be measured through push-rod type thermal expansion coefficient measurement (TMA). It is difficult to directly measure the thermal expansion coefficient of the ceramic powder, but when a fired body of a composite powder containing a glass powder and the ceramic powder at a predetermined volume ratio is used as a measurement sample and the thermal expansion coefficient of the fired body is measured, the thermal expansion coefficient of the ceramic powder alone can be determined by calculation.

Among LAS-based crystals ($Li_2O$—$Al_2O_3$-$nSiO_2$), the β-eucryptite ($Li_2O$—$Al_2O_3$-$2SiO_2$) and the β-quartz solid solution ($Li_2O$—$Al_2O_3$-$nSiO_2$: n>2), in which $SiO_2$ is additionally solid solved from the β-eucryptite, have negative expansion characteristics. Meanwhile, among the LAS-based crystals ($Li_2O$—$Al_2O_3$-$nSiO_2$), a crystal in which $SiO_2$ is solid solved until n exceeds around 4 is liable to transform into a β-spodumene solid solution, which has a positive thermal expansion coefficient. In view of the foregoing, in the ceramic powder according to the embodiment of the present invention, the β-eucryptite or the β-quartz solid solution, which has negative expansion characteristics, is precipitated as a main crystal phase.

In a related-art LAS-based ceramic powder, positive expansion in an a-axis direction is absorbed and negative expansion in a c-axis direction is reflected through microcracks present in a grain boundary between crystal grains, and thus the crystal grains exhibit negative volume expansion as a whole. The microcracks occur when strain is caused in the grain boundary between the crystal grains through anisotropic expansion of the crystal grains. Meanwhile, the microcracks do not occur when the crystal grains are reduced in size. Therefore, when the related-art LAS-based ceramic powder is applied to a sealing material, it is difficult to finely pulverize the related-art LAS-based ceramic powder.

The inventor of the present invention has made further investigations, and as a result, has found that, when a small amount of a component not constituting a LAS-based crystal is solid solved in a main crystal, for example, when a small amount of $TiO_2$ and/or $ZrO_2$ is solid solved, the negative expansion characteristics can be maintained even when crystal grains are reduced in size. A mechanism thereof is not experimentally clarified, but the inventor of the present invention presumes as described below. When a small amount of a heterogeneous component is solid solved in the LAS-based crystal, strain is caused in a crystal grain structure, and the positive expansion in the a-axis direction is reduced. Thus, the crystal grains exhibit negative volume expansion. As a result, the negative expansion characteristics are maintained regardless of the presence or absence of the microcracks. Moreover, the mechanism is easily expressed when, among ceramic powders each exhibiting negative expansion, the β-eucryptite or the β-quartz solid solution is precipitated as a main crystal. It is presumed that, other than adopting the above-mentioned method, when strain is caused in the crystal grain structure, and thus the positive expansion in the a-axis direction is reduced, a similar effect can be exhibited.

The ceramic powder according to the embodiment of the present invention preferably comprises $TiO_2$ and/or $ZrO_2$ in a composition.

The ceramic powder according to the embodiment of the present invention preferably has an average particle diameter of 20 μm or less. Herein, the "average particle diameter $D_{50}$" refers to a value measured by laser diffractometry, and represents, in a cumulative particle size distribution curve on a volume basis measured by the laser diffractometry, a particle diameter at which the integration amount of particles from a smaller particle side is 50% in a cumulative manner.

It is preferred that the ceramic powder according to the embodiment of the present invention comprise as a composition, in terms of mol %, 16% to 30% of $Li_2O$, 16% to 30% of $Al_2O_3$, and 40% to 68% of $SiO_2$. With this, the positive-expansion β-spodumene solid solution is less liable to be precipitated, and hence the negative expansion characteristics are easily maintained.

It is preferred that the ceramic powder according to the embodiment of the present invention be substantially free of a glass phase. With this, the ceramic powder (particularly, $Li_2O$) is less liable to be dissolved in glass at the time of sealing, and hence a sealing material is less liable to be devitrified. In addition, the thermal expansion coefficient of the sealing material is easily maintained. The presence or absence of the glass phase may be determined with an X-ray diffractometer or the like. For example, when the ceramic powder has a crystallinity of 95% or more, it may be judged that the ceramic powder is substantially free of the glass phase. The "crystalinity" refers to a value determined as described below. X-ray diffraction is measured by a powder method, and a halo area corresponding to the mass of an amorphous component and a peak area corresponding to the mass of a crystalline component are calculated, and then the crystalinity is determined by the expression: [peak area] *100/[peak area+halo area] (%).

When the ceramic powder is produced through a solid phase reaction, the ceramic powder substantially free of the glass phase can be obtained. Meanwhile, when the ceramic powder is produced by a melting method, the glass phase remains in the ceramic powder. The melting method is a method involving melting a raw material batch once to obtain a glass melt, followed by cooling and pulverizing the resultant melt, and subjecting the resultant to heat treatment as required, to thereby produce a ceramic powder.

As a result of extensive efforts, the inventor of the present invention has found that the above-mentioned second technical object can be achieved by adopting a LAS-based ceramic powder comprising β-eucryptite or a β-quartz solid solution as a main crystal phase and allowing the LAS-based ceramic powder to form a composite with a glass powder. Thus, the finding is proposed as the present invention. That is, a composite powder material according to one embodiment of the present invention comprises a glass powder and a ceramic powder, wherein the ceramic powder comprises the ceramic powder according to the above-mentioned embodiment of the present invention.

In the composite powder material according to the embodiment of the present invention, the glass powder preferably comprises as a glass composition, in terms of mol %, 28% to 60% of $Bi_2O_3$, 15% to 37% of $B_2O_3$, and 1% to 30% of ZnO.

A sealing material according to one embodiment of the present invention, which is devised in order to achieve the above-mentioned second technical object, comprises the composite powder material according to the above-mentioned embodiment of the present invention.

The sealing material according to the embodiment of the present invention is preferably used for laser sealing.

DESCRIPTION OF EMBODIMENTS

Figure 1:
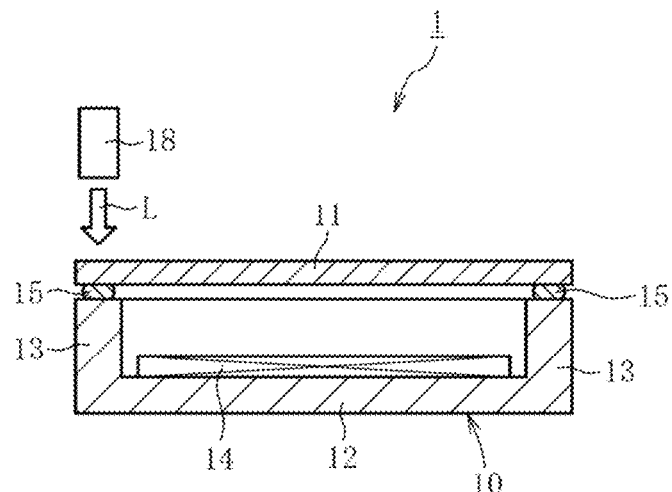
FIG. 1 is a schematic sectional view for illustrating a hermetic package according to one embodiment of the present invention.

In an embodiment of the present invention, a composite powder material comprises a glass powder and a ceramic powder. The glass powder is a material which acts as a melting accelerate component and softens and flows at the time of laser sealing to hermetically integrate objects to be sealed with each other. The ceramic powder is a material which acts as a framework material and increases the mechanical strength of a sealing layer while reducing the thermal expansion coefficient of the composite powder material.

In the ceramic powder, it is preferred that β-eucryptite or a β-quartz solid solution be precipitated as a main crystal phase and no other crystal be precipitated, but as long as the effects of the present invention are not significantly impaired, the other crystal may be precipitated in a small amount.

The ceramic powder preferably comprises as a composition, in terms of mol %, 16% to 30% (more preferably 18% to 25%) of $Li_2O$, 10% to 35% (more preferably 16% to 30%, still more preferably 18% to 25%) of $Al_2O_3$, and 30% to 68% (more preferably 40% to 68%, still more preferably 48% to 64%) of $SiO_2$. When the composition of the ceramic powder is outside the above-mentioned range, it becomes difficult to precipitate the β-eucriptite or the β-quartz solid solution as a main crystal phase. In addition, it becomes difficult to maintain negative expansion characteristics when the particle diameter of the ceramic powder is reduced. Any component other than the above-mentioned components, such as a sintering aid, may be introduced within a range of 10% or less.

The ceramic powder preferably comprises $TiO_2$ and/or $ZrO_2$ in the composition. The content thereof in terms of a total content is preferably from 0.005 mol % to 5 mol %, particularly preferably from 0.1 mol % to 4 mol %. Also the individual content thereof is preferably from 0.005 mol % to 5 mol %, particularly preferably from 0.1 mol % to 4 mol %. When the content of $TiO_2$ and/or $ZrO_2$ is too small, the amount of solid solved $TiO_2$ and/or $ZrO_2$ in a LAS-based crystal is reduced. As a result, the ceramic powder is difficult to maintain negative expansion characteristics when reduced in particle diameter. Meanwhile, when the content of $TiO_2$ and/or $ZrO_2$ is too large, $TiO_2$ and/or $ZrO_2$ is not entirely solid solved in the LAS-based crystal, and $TiO_2$ and/or $ZrO_2$ is liable to remain as an oxide. As a result, the ceramic powder is difficult to maintain the negative expansion characteristics.

The ceramic powder has an average particle diameter $D_{50}$ of preferably 20 μm or less, 10 μm or less, 7 μm or less, or 5 μm or less, particularly preferably from 1 μm to 3 μm. The ceramic powder can maintain the negative expansion characteristics even when having a small particle diameter. Therefore, the rate of the contribution of the effect to the negative expansion characteristics is increased as the particle diameter of the ceramic powder becomes smaller. The "average particle diameter $D_{50}$" refers to a value measured by laser diffractometry, and represents, in a cumulative particle size distribution curve on a volume basis measured by the laser diffractometry, a particle diameter at which the integration amount of particles from a smaller particle side is 50% in a cumulative manner.

The ceramic powder has a maximum particle diameter $D_{max}$ of preferably 50 μm or less, 30 μm or less, 20 μm or less, or 15 μm or less, particularly preferably from 2 μm to 10 μm. The ceramic powder can maintain the negative expansion characteristics even when having a small particle diameter. Therefore, the rate of the contribution of the effect to the negative expansion characteristics is increased as the particle diameter of the ceramic powder becomes smaller. The "maximum particle diameter $D_{max}$" refers to a value measured by the laser diffractometry, and represents, in the cumulative particle size distribution curve on a volume basis measured by the laser diffractometry, a particle diameter at which the integration amount of the particles from the smaller particle side is 99% in a cumulative manner.

The ceramic powder has a negative thermal expansion coefficient (less than $0 \times 10^{-7}/°C.$) in a range of from 30° C. to 300° C. The thermal expansion coefficient is preferably $-1 \times 10^{-7}/°C.$ or less or $-3 \times 10^{-7}/°C.$ or less, particularly preferably $-20 \times 10^{-7}/°C.$ or more and $-4 \times 10^{-7}/°C.$ or less. When the thermal expansion coefficient in a range of from 30° C. to 300° C. is too high, it becomes difficult to sufficiently reduce the thermal expansion coefficient of a sealing material.

In the composite powder material, the content of the ceramic powder is from 1 vol % to 45 vol %, preferably from 10 vol % to 45 vol % or from 15 vol % to 40 vol %, particularly preferably from 20 vol % to 35 vol %. When the content of the ceramic powder is too large, the content of the glass powder is relatively reduced, and hence it becomes difficult to ensure desired flowability and thermal stability. When the content of the ceramic powder is too small, an effect exhibited by the addition of the ceramic powder becomes poor.

A ceramic powder other than the above-mentioned ceramic powder may be further introduced as the ceramic powder. The other ceramic powder may comprise, for example, one kind or two or more kinds selected from cordierite, zircon, alumina, mullite, willemite, zirconium phosphate, zirconium phosphate tungstate, and zircon tungstate, but the content thereof is preferably from 0 vol % to 15 vol %, particularly preferably from 0 vol % to less than 10 vol % in terms of a total content.

In the composite powder material, any of various glass powders may be used as the glass powder. For example, $Bi_2O_3$-based glass, $V_2O_5$-based glass, or SnO-based glass is suitable in view of a low melting point characteristic, and $Bi_2O_3$-based glass is particularly preferred in view of thermal stability and water resistance. As used herein, the term "-based glass" refers to glass which comprises the specified components as essential components and in which the total content of the specified components is 25 mol % or more, preferably 30 mol % or more, more preferably 35 mol % or more. The glass composition of the glass powder is preferably substantially free of PbO (less than 0.1 mol %) from an environmental point of view.

The $Bi_2O_3$-based glass preferably comprises as a glass composition, in terms of mol %, 28% to 60% of $Bi_2O_3$, 15% to 37% of $B_2O_3$, and 1% to 30% of ZnO. The reasons why the content range of each component is limited as described above are described below. In the description of the glass composition range, the expression "%" means "mol %".

$Bi_2O_3$ is a main component for lowering a softening point, and its content is preferably from 28% to 60% or from 33% to 55%, particularly preferably from 35% to 45%. When the content of $Bi_2O_3$ is too small, the softening point becomes too high and hence flowability is liable to lower. Meanwhile, when the content of $Bi_2O_3$ is too large, the glass is liable to devitrify at the time of firing, and owing to the devitrification, the flowability is liable to lower.

$B_2O_3$ is an essential component as a glass-forming component, and its content is preferably from 15% to 37% or from 20% to 33%, particularly preferably from 25% to 30%. When the content of $B_2O_3$ is too small, a glass network is hardly formed, and hence the glass is liable to devitrify at the time of firing. Meanwhile, when the content of is too large, the glass has an increased viscosity, and hence the flowability is liable to lower.

ZnO is a component which enhances devitrification resistance, and its content is preferably from 1% to 30%, from 3% to 25%, or from 5% to 22%, particularly preferably from 9% to 20%. When the content is less than 1%, or more than 30%, the glass composition loses its component balance, and hence the devitrification resistance is liable to lower.

In addition to the above-mentioned components, for example, the following components may be added.

$SiO_2$ is a component which enhances water resistance, while having an action of increasing the softening point. Accordingly, the content of $SiO_2$ is preferably from 0% to 5%, from 0% to 3%, or from 0% to 2%, particularly preferably from 0% to 1%. In addition, when the content of $SiO_2$ is too large, the glass is liable to devitrify at the time of firing.

$Al_2O_3$ is a component which enhances the water resistance. The content of $Al_2O_3$ is preferably from 0% to 10% or from 0% to 5%, particularly preferably from 0.1% to 2%. When the content of $Al_2O_3$ is too large, there is a risk in that the softening point is inappropriately increased.

$Li_2O$, $Na_2O$, and $K_2O$ are each a component which reduces the devitrification resistance. Therefore, the content of each of $Li_2O$, $Na_2O$, and $K_2O$ is from 0% to 5% or from 0% to 3%, particularly preferably from 0% to less than 1%.

MgO, CaO, SrO, and BaO are each a component which enhances the devitrification resistance, but are each a component which increases the softening point. Therefore, the content of each of MgO, CaO, SrO, and BaO is from 0% to 20% or from 0% to 10%, particularly preferably from 0% to 5%.

In order to lower the softening point of $Bi_2O_3$-based glass, it is required to introduce a large amount of $Bi_2O_3$ into the glass composition, but when the content of $Bi_2O_3$ is increased, the glass is liable to devitrify at the time of firing, and owing to the devitrification, the flowability is liable to lower. This tendency is particularly remarkable when the content of $Bi_2O_3$ is 30% or more. As a countermeasure for this problem, the addition of CuO can effectively suppress the devitrification of the glass even when the content of $Bi_2O_3$ is 30% or more. Further, when CuO is added, laser absorption characteristics at the time of laser sealing can be enhanced. The content of CuO is preferably from 0% to 40%, from 5% to 35%, or from 10% to 30%, particularly preferably from 15% to 25%. When the content, of CuO is too large, the glass composition loses its component balance, and hence the devitrification resistance is liable to lower to the worse.

$Fe_2O_3$ is a component which enhances the devitrification resistance and the laser absorption characteristics, and its content is preferably from 0% to 10% or from 0.1% to 5%, particularly preferably from 0.5% to 3%. When the content of $Fe_2O_3$ is too large, the glass composition loses its component balance, and hence the devitrification resistance is liable to lower to the worse.

$Sb_2O_3$ is a component which enhances the devitrification resistance, and its content is preferably from 0% to 5%, particularly preferably from 0% to 2%. When the content of $Sb_2O_3$ is too large, the glass composition loses its component balance, and hence the devitrification resistance is liable to lower to the worse.

The glass powder preferably has an average particle diameter $D_{50}$ of less than 15 μm or from 0.5 μm to 10 μm, particularly preferably from 1 μm to 5 μm. As the average particle diameter of the glass powder is smaller, the softening point of the glass powder lowers. The "average particle diameter $D_{50}$" refers to a value measured by laser diffractometry, and represents, in a cumulative particle size distribution curve on a volume basis measured by the laser diffractometry, a particle diameter at which the integration amount of particles from a smaller particle side is 50% in a cumulative manner.

Any powder material other than the glass powder and the ceramic powder may be introduced in the composite powder material described above. For example, in order to enhance the laser absorption characteristics, a laser absorbent, such as a Mn—Fe—Al-based oxide, carbon, or a Mn—Fe—Cr-based oxide, may be included at from 1 vol % to 15 vol %. In addition, glass beads, a spacer, or the like may be introduced.

The composite powder material described above may be used in a powdery state, but is preferably formed into a paste by being uniformly kneaded with a vehicle from the viewpoint of improving handleability. The vehicle generally comprises a solvent and a resin. The resin is added for the purpose of adjusting the viscosity of the paste. In addition, a surfactant, a thickener, or the like may also be added thereto as required. The produced paste is applied onto a surface of an object to be sealed by means of a coating machine, such as a dispenser or a screen printing machine.

As the resin, there may be used an acrylic acid ester (acrylic resin), ethylcellulose, a polyethylene glycol derivative, nitrocellulose, polymethylstyrene, polyethylene carbonate, a methacrylic acid ester, and the like. In particular, an acrylic acid ester and nitrocellulose are preferred because of good thermolytic property.

As the solvent, there may be used N,N'-dimethyl formamide (DMF), α-terpineol, a higher alcohol, γ-butyrolactone (γ-BL), tetralin, butylcarbitol acetate, ethyl acetate, isoamyl acetate, diethylene glycol monoethyl ether, diethylene glycol monoethyl ether acetate, benzyl alcohol, toluene, 3-methoxy-3-methylbutanol, water, triethylene glycol monomethyl ether, triethylene glycol dimethyl ether, dipropylene glycol monomethyl ether, dipropylene glycol monobutyl ether, tripropylene glycol monomethyl ether, tripropylene glycol monobutyl ether, propylene carbonate, dimethyl sulfoxide (DMSO), N-methyl-2-pyrrolidone, and the like. In particular, α-terpineol is preferred because of high viscosity and good solubility of a resin and the like.

The ceramic powder described above is preferably produced by the following production method. Specifically, a method of producing the ceramic powder preferably comprises: a step of firing a raw material batch to obtain, through a solid phase reaction, a sintered body having precipitated therein β-eucryptite or a β-quartz solid solution as a main crystal phase; and a step of pulverizing the sintered body to obtain the ceramic powder.

When, in the method of producing the ceramic powder, the sintered body is produced through the solid phase reaction as described above, a glass phase does not remain in the sintered body. As a result, the ceramic powder (particularly, $Li_2O$) is less liable to be dissolved in glass at the time of sealing, and hence the glass is less liable to be devitrified. In addition, the thermal expansion coefficient of the sealing material is easily maintained.

Various raw materials may be used as introduction raw materials for Li, Al, and Si. Of those materials, a pulverized product of a pre-sintered body containing Li, Al, and Si is preferably used. When the whole or part of the introduction raw materials are pre-sintered, a precipitated crystal can be homogenized, and variations in characteristics of the ceramic powder can be reduced. In addition, other than the pulverized product of a pre-sintered body containing Li, Al, and Si, an oxide raw material, a hydroxide raw material, a carbonate raw material, or the like may be used.

When $TiO_2$ and/or $ZrO_2$ is solid solved in the LAS-based crystal, various raw materials may be used as introduction raw materials for Ti and Zr. For example, a pulverized product of a pre-sintered body containing Ti and Zr, an oxide raw material, a hydroxide raw material, or a carbonate raw material may be used.

The firing of the raw material batch may be performed with an electric furnace, a gas furnace, or the like. A firing temperature of the raw material batch is preferably from 1,000° C. to 1,450° C., particularly preferably from 1,250° C. to 1,400° C. When the firing temperature is too low, the amount of the precipitated crystal in the ceramic powder is liable to be reduced. Meanwhile, when the firing temperature is too high, part of the sintered body is vitrified, and a glass phase is liable to remain in the sintered body. In addition, the degree of sintering of the sintered body is increased, and hence it becomes difficult to pulverize the sintered body. A firing time period of the raw material batch is preferably from 15 hours to 40 hours. When the firing time period is too short, the amount of the precipitated crystal in the ceramic powder is liable to be reduced. Meanwhile, when the firing time period is too long, the degree of sintering of the sintered body is increased, and hence it becomes difficult to pulverize the sintered body.

The raw material batch is preferably wet pulverized and mixed with a ball mill or the like. With this, the homogeneity of the raw material batch is improved, and hence the solid phase reaction can be promoted.

The pulverization of the sintered body may be performed with a ball mill, a jaw crusher, a jet mill, a disc mill, a spectro mill, a grinder, a mixer mill, or the like, but from the viewpoints of running cost and pulverization efficiency, dry or wet pulverization with a ball mill is preferred. A pulverized particle size of the sintered body is preferably smaller than the size of a precipitated crystal grain. In addition, the pulverized particle size of the sintered body is preferably adjusted to the extent that a grain boundary between the crystal grains is substantially free of microcracks. With this, the particle diameter of the ceramic powder is reduced, and hence the ceramic powder can be suitably applied to a hermetic package including a sealing layer having a small thickness. When the ceramic powder has an average particle diameter $D_{50}$ of less than 10 μm, the grain boundary between the precipitated crystal grains is in a state of being substantially free of the microcracks.

After the pulverization of the sintered body, the particle diameter of the sintered body is preferably controlled through sieve classification or air classification as required.

The composite powder material described above has high flowability at the time of laser sealing and has a low thermal expansion coefficient, and hence can be suitably used as a sealing material for laser sealing. That is, the composite powder material can be suitably used for laser sealing of a package base and a glass cover of a hermetic package. Specifically, in the hermetic package in which the package base and the glass cover are hermetically sealed with each other through intermediation of a sealing layer, the sealing layer is preferably formed of a sintered body of the composite powder material. The hermetic package is described in detail below.

The package base preferably comprises a base part and a frame part formed on the base part. With this, an internal device, such as a sensor device, is easily housed within the frame part of the package base. The frame part of the package base is preferably formed in a frame shape along a peripheral end edge region of the package base. With this, an effective area for functioning as a device can be enlarged. In addition, the internal device, such as the sensor device, is easily housed in a space in the package base. Besides, for example, joining of wiring is easily performed.

On a top of the frame part, a surface of a region in which the sealing layer is to be formed preferably has a surface roughness Ra of less than 1.0 μm. When the surface roughness Ra on the surface is increased, the accuracy of the laser sealing is liable to be reduced. Herein, the "surface roughness Ra" may be measured with, for example, a contact-type or noncontact-type laser film thickness meter, or a surface roughness meter.

The width of the top of the frame part is preferably from 100 μm to 7,000 μm or from 200 μm to 6,000 μm, particularly preferably from 300 μm to 5,000 μm. When the width of the top of the frame part is too small, it becomes difficult to align the sealing layer and the top of the frame part. Meanwhile, when the width of the top of the frame part is too large, the effective area for functioning as a device is reduced.

The package base is preferably formed of any one of glass ceramic, aluminum nitride, and aluminum oxide, or a composite material thereof (e.g., a composite material in which aluminum nitride and glass ceramic are integrated with each other). Glass ceramic easily forms a reactive layer with the sealing layer, and hence high sealing strength can be ensured through the laser sealing. Further, a thermal via can be easily formed, and hence a situation in which the temperature of the hermetic package is excessively increased can be properly prevented. Aluminum nitride and aluminum oxide each have a satisfactory heat dissipating property, and hence the situation in which the temperature of the hermetic package is excessively increased can be properly prevented.

It is preferred that glass ceramic, aluminum nitride, and aluminum oxide each have dispersed therein a black pigment (be each sintered under a state in which a black pigment is dispersed therein). With this, the package base can absorb laser light transmitted through the sealing layer. As a result, a portion of the package base to be brought into contact with the sealing layer is heated during the laser sealing, and hence the formation of the reactive layer can be promoted at an interface between the sealing layer and the package base.

The package base having dispersed therein the black pigment preferably has a property of absorbing laser light to be radiated, for example, has a thickness of 0.5 mm and a total light transmittance of 10% or less (desirably 5% or less) at a wavelength (808 nm) of laser light to be radiated. With this, the temperature of the sealing layer is easily increased at the interface between the package base and the sealing layer.

The thickness of the base part of the package base is preferably from 0.1 mm to 2.5 mm, particularly preferably from 0.2 mm to 1.5 mm. With this, thinning of the hermetic package can be achieved.

The height of the frame part of the package base, that, is, a height obtained by subtracting the thickness of the base part from the package base is preferably from 100 μm to 2,500 μm, particularly preferably from 200 μm to 1,500 μm. With this, thinning of the hermetic package is easily achieved while the internal device is properly housed therein.

Various glasses may be used for the glass cover. For example, alkali-free glass, alkali borosilicate glass, or soda lime glass may be used. The glass cover may be laminated glass obtained by bonding a plurality of glass sheets.

A functional film may be formed on a surface of the glass cover on an internal device side, or on a surface of the glass cover on an outside. An antireflection film is particularly preferred as the functional film. With this, light reflected on the surface of the glass cover can be reduced.

The thickness of the glass cover is preferably 0.1 mm or more or from 0.15 mm to 2.0 mm, particularly preferably from 0.2 mm to 1.0 mm. When the thickness of the glass cover is small, the strength of the hermetic package is liable to be reduced. Meanwhile, when the thickness of the glass cover is large, it becomes difficult to achieve thinning of the hermetic package.

The sealing layer has a function of softening and deforming by absorbing laser light to form a reactive layer in a surface layer of the package base, to thereby hermetically integrate the package base and the glass cover with each other.

A difference in thermal expansion coefficient between the glass cover and the sealing layer is preferably less than $50 \times 10^{-7}/°$ C. or less than $40 \times 10^{-7}/°$ C., particularly preferably $30 \times 10^{-7}/°$ C. or less. When the difference in thermal expansion coefficient is too large, a stress remaining in the sealed sites is improperly increased, and the hermetic reliability of the hermetic package is liable to be reduced.

The sealing layer is preferably formed so that its contact position with the frame part is distant from an inner peripheral end edge of the top of the frame part and is distant from an outer peripheral end edge of the top of the frame part. The sealing layer is more preferably formed at a position distant from the inner peripheral end edge of the top of the frame part by 50 μm or more, 60 μm or more, or from 70 μm to 2,000 μm, particularly from 80 μm to 1,000 μm. When a distance between the inner peripheral end edge of the top of the frame part and the sealing layer is too short, it becomes difficult to release heat generated through local heating during the laser sealing, and hence the glass cover is liable to be broken in the course of cooling. Meanwhile, when the distance between the inner peripheral end edge of the top of the frame part and the sealing layer is too long, it becomes difficult to achieve downsizing of the hermetic package. In addition, the sealing layer is more preferably formed at a position distant from the outer peripheral end edge of the top of the frame part by 50 μm or more, 60 μm or more, or from 70 μm to 2,000 μm, particularly from 80 μm to 1,000 μm. When a distance between the outer peripheral end edge of the top of the frame part and the sealing layer is too short, it becomes difficult to release heat generated through local heating during the laser sealing, and hence the glass cover is liable to be broken in the course of cooling. Meanwhile, when the distance between the outer peripheral end edge of the top of the frame part and the sealing layer is too long, it becomes difficult to achieve downsizing of the hermetic package.

The sealing layer is preferably formed so that its contact position with the glass cover is distant from an end edge of the glass cover by 50 μm or more, 60 μm or more, or from 70 μm to 1,500 μm, particularly from 80 μm to 800 μm. When a distance between the end edge of the glass cover and the sealing layer is too short, at the time of laser sealing, a difference in surface temperature between the surface of the glass cover on the internal device side and the surface of the glass cover on the outside is increased in an end edge region of the glass cover, and the glass cover is liable to be broken.

The sealing layer is preferably formed on a center line of the top of the frame part in a width direction, that is, in a middle region of the top of the frame part. With this, heat generated through local heating during the laser sealing is easily released, and hence the glass cover is less liable to be broken. When the top of the frame part has a sufficiently large width, the sealing layer does not need to be formed on the center line of the top of the frame part in the width direction.

The average thickness of the sealing layer is preferably less than 8.0 μm, particularly preferably 1.0 μm or more and less than 7.0 μm. As the average thickness of the sealing layer is reduced more, an α-ray emission rate in the hermetic package is reduced more, and hence a soft error of the internal device is easily prevented. As the average thickness of the sealing layer is reduced more, the accuracy of the laser sealing is improved more. Further, when the thermal expansion coefficients of the sealing layer and the glass cover do not match each other, a stress remaining in the sealed sites after the laser sealing can also be reduced. As a method of controlling the average thickness of the sealing layer as described above, the following methods are given: a method involving thinly applying a composite powder material paste; and a method involving subjecting the surface of the sealing layer to polishing treatment.

The maximum width of the sealing layer is preferably 1 μm or more and 2,000 μm or less, particularly preferably 100 μm or more and 1,500 μm or less. When the maximum width of the sealing layer is small, the sealing layer is easily distant from the end edges of the frame part, and hence a stress remaining in the sealed sites after the laser sealing is easily reduced. Further, the width of the frame part of the package base can be reduced, and thus the effective area for functioning as a device can be enlarged. Meanwhile, when the maximum width of the sealing layer is too small, bulk fracture is liable to occur in the sealing layer when a large shear stress is applied to the sealing layer. Further, the accuracy of the laser sealing is liable to be reduced.

Now, a hermetic package according to one embodiment of the present invention is described with reference to the drawings. As illustrated in FIG. 1, a hermetic package 1 comprises a package base 10 and a glass cover 11. In addition, the package base 10 comprises a base part 12 and a frame part 13 in a frame shape on a peripheral end edge of the base part 12. Moreover, an internal device 14 is housed in a space surrounded by the frame part 13 of the package base 10. Electrical wiring (not shown) configured to electrically connect the internal device 14 to an outside is formed in the package base 10.

A sealing layer 15 is formed of a sintered body of a composite powder material, and the composite powder material comprises a glass powder and a refractory filler powder including the ceramic powder described above, and is substantially free of a laser absorber. Moreover, the glass powder comprises as a glass composition, in terms of mol %, 28% to 60% of $Bi_2O_3$, 15% to 37% of $B_2O_3$, and 1% to 30% of ZnO, and is substantially free of PbO. In addition, between a top of the frame part 13 of the package base 10 and a surface of the glass cover 11 on an internal device 14 side, the sealing layer 15 is formed over the entire length of the top of the frame part 13. The width of the sealing layer 15 is smaller than the width of the top of the frame part 13 of the package base 10, and further, the sealing layer 15 is distant from an end edge of the glass cover 11. Further, the average thickness of the sealing layer 15 is less than 8.0 μm.

The hermetic package 1 may be produced as described below. First, the glass cover 11 in which the sealing layer 15 is formed in advance is placed on the package base 10 so that the sealing layer 15 and the top of the frame part 13 are brought into contact with each other. Subsequently, while the glass cover 11 is pressed with a pressing jig, laser light L output from a laser irradiation apparatus is radiated along the sealing layer 15 from a glass cover 11 side. With this, the sealing layer 15 softens and flows to react with a surface layer on the top of the frame part 13 of the package base 10, to thereby hermetically integrate the package base 10 and the glass cover 11 with each other. Thus, a hermetic structure of the hermetic package 1 is formed.

The ceramic powder described above is preferably used for a composite powder material with a glass powder, but applications thereof are not limited thereto. In addition, other than sealing applications, the composite powder material described above is applicable to insulation coating applications for low-expansion materials, or to painting applications by adding and mixing a pigment or the like thereto.

EXAMPLES

Now, the present invention is described in detail based on Examples. The following Examples are merely illustrative. The present invention is by no means limited to the following Examples.

(Production of Pulverized Product of Pre-Sintered Body)

Raw materials shown in Table 1 were loaded into a pot made of alumina having an inner volume of 3.6 L and wet pulverized and mixed with each other for 12 hours. Thus, a raw material batch was produced. In the pulverization and mixing, 3,000 g of zirconia balls of φ3.0 mm were used as pulverization balls, and 600 ml of an alcohol was used as a dispersion medium.

TABLE 1

| (Mass %) | Pre-sintered body 1 | Pre-sintered body 2 |
|---|---|---|
| Aluminum hydroxide | 44 | 31 |
| Lithium carbonate | 23 | 15 |
| Silicon oxide | 33 | 54 |

Next, the raw material batch was dried, crushed, and retained at 800° C. for 8 hours and then fired at 1,350° C. for 16 hours in an electric furnace. A temperature increasing rate from room temperature to 800° C. was set to 5° C./min, a temperature increasing rate from 800° C. to 1,350° C. was set to 1° C./min, and a temperature decreasing rate from 1,350° C. was set to 1° C./min.

Further, the resultant sintered body was pulverized through dry pulverization and wet pulverization until the sintered body achieved an average particle diameter $D_{50}$ of 1.0 µm. Thus, pulverized products of pre-sintered bodies were produced.

(Production of Ceramic Powder)

A raw material batch shown in Table 2 was loaded into a pot made of alumina having an inner volume of 3.6 L and wet pulverized and mixed for 12 hours. In the pulverization and mixing, 3,000 g of zirconia balls of φ3.0 mm were used as pulverization balls, and 600 ml of an alcohol was used as a dispersion medium.

TABLE 2

| (Mass %) | No. 1 | No. 2 | No. 3 |
|---|---|---|---|
| Pre-sintered body 1 | 98 | 98 | 0 |
| Pre-sintered body 2 | 0 | 0 | 98 |
| Aluminum hydroxide | 0 | 0 | 0 |
| Lithium carbonate | 0 | 0 | 0 |
| Silicon oxide | 0 | 0 | 0 |
| Titanium oxide | 2 | 0 | 0 |
| Zirconium oxide | 0 | 2 | 2 |

Next, the raw material batch was dried, crushed, and retained at 800° C. for 8 hours and then fired at 1,350° C. for 16 hours in an electric furnace. A temperature increasing rate from room temperature to 800° C. was set to 5° C./min, a temperature increasing rate from 800° C. to 1,350° C. was set to 1° C./min, and a temperature decreasing rate from 1,350° C. was set to 1° C./min.

Further, the resultant sintered body was pulverized through dry pulverization and wet pulverization until the sintered body achieved an average particle diameter $D_{50}$ of 1.0 µm. Thus, each of Sample Nos. 1 to 3 was obtained. The compositions of Sample Nos. 1 to 3 are shown in Table 3. In each of Sample Nos. 1 and 2, a main crystal was β-eucryptite, and in Sample No. 3, a main crystal was a β-spodumene solid solution.

TABLE 3

| (Mol %) | No. 1 | No. 2 | No. 3 |
|---|---|---|---|
| $Li_2O$ | 25 | 25 | 15 |
| $Al_2O_3$ | 25 | 25 | 15 |
| $SiO_2$ | 49 | 49 | 69 |
| $TiO_2$ | 1 | 0 | 1 |
| $ZrO_2$ | 0 | 1 | 0 |
| α30-300 (×10$^{-7}$/° C.) | −6 | −4 | 4 |

(Production of $Bi_2O_3$-Based Glass Powder)

A glass batch was prepared by blending raw materials, such as various oxides and carbonates, so that a glass powder comprising as a glass composition, in terms of mol %, 38% of $Bi_2O_3$, 27% of $B_2O_3$, 5% of ZnO, 4% of BaO, 24% of CuO, 1% of $Fe_2O_3$, and 1% of $Al_2O_3$ was obtained. The prepared glass batch was loaded into a platinum crucible and melted at from 1,000° C. to 1,100° C. for 2 hours. Next, the resultant molten glass was formed into a thin sheet shape with a water-cooling roller. Finally, the glass in the thin sheet shape was pulverized with a ball mill, and then subjected to air classification. Thus, a $Bi_2O_3$-based glass powder was obtained. The $Bi_2O_3$-based glass powder had an average particle diameter $D_{50}$ of 2.5 µm, a maximum particle diameter $D_{max}$ of 10 µm, and a thermal expansion coefficient in a range of from 30° C. to 300° C. of 104×10$^{-7}$/° C.

(Production of Composite Powder Material)

The $Bi_2O_3$-based glass powder described above and the ceramic powder shown in Table 3 were mixed at a volume ratio of 75:25. Thus, a composite powder material (sealing material) was obtained.

The resultant composite powder material was fired at 500° C. to provide a dense fired body. After that, a measurement sample for push-rod type thermal expansion coefficient measurement (TMA) was produced by processing the fired body into a predetermined shape. TMA was performed in a temperature range of from 30° C. to 300° C. through use of the measurement sample. The thermal expansion coefficient α of the ceramic powder shown in Table 3 was calculated based on the thermal expansion coefficient of the composite powder material obtained.

Figure 2:
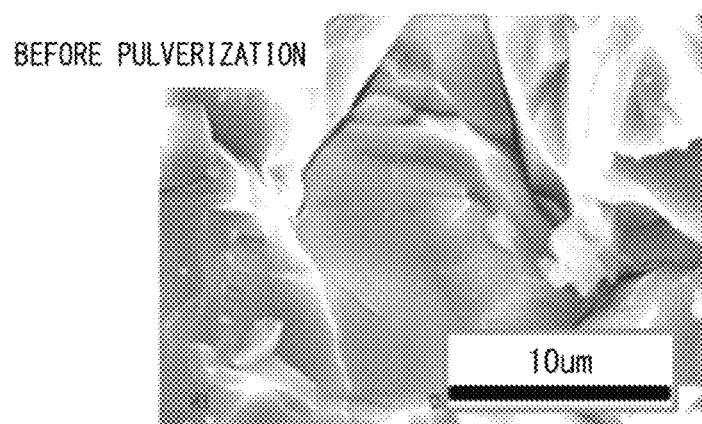
FIG. 2 is an electron micrograph of Sample No. 1 (before pulverization) shown in Table 2.
Figure 3:
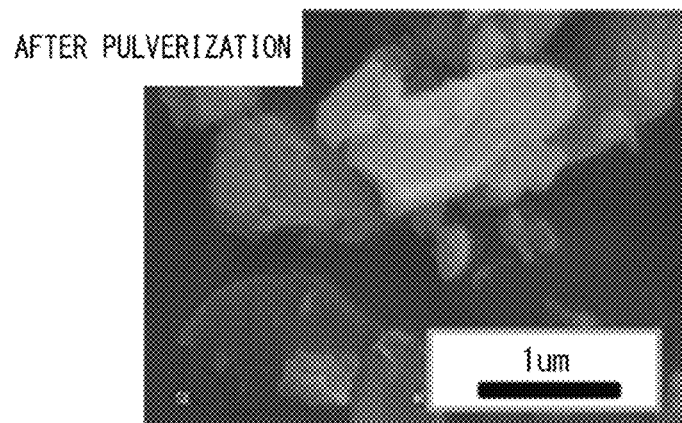
FIG. 3 is an electron micrograph of Sample No. 1 (after pulverization) shown in Table 2.
Figure 4:
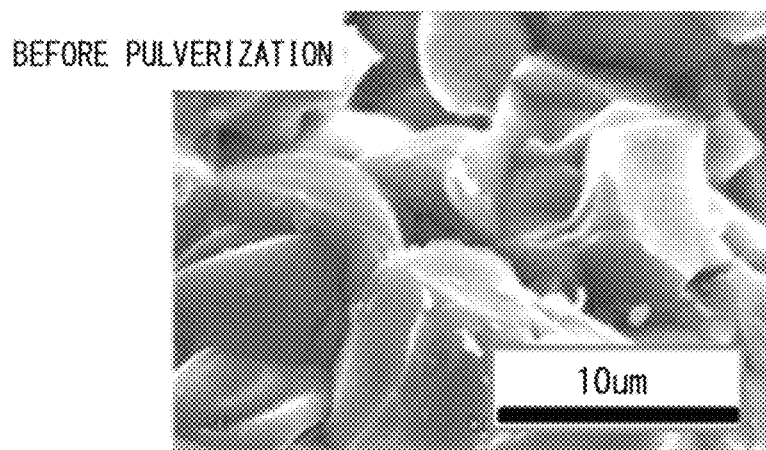
FIG. 4 is an electron micrograph of Sample No. 2 (before pulverization) shown in Table 2.
Figure 5:
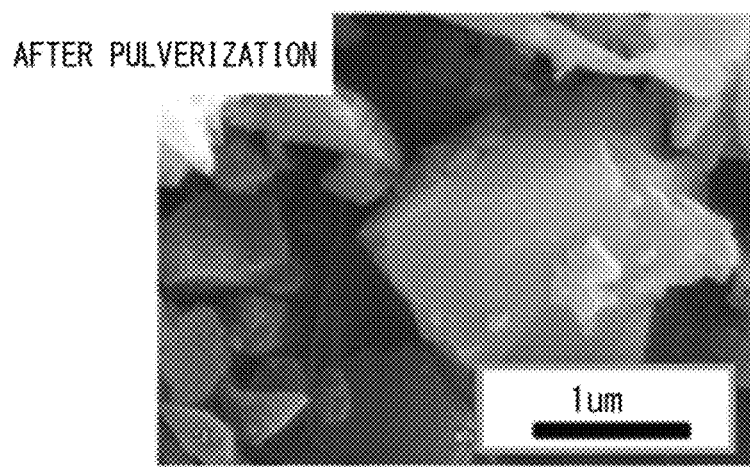
FIG. 5 is an electron micrograph of Sample No. 2 (after pulverization) shown in Table 2.

FIG. 2 is an electron micrograph of Sample No. 1 (before pulverization) shown in Tables 2 and 3. FIG. 3 is an electron micrograph of Sample No. 1 (after pulverization) shown in Tables 2 and 3. FIG. 4 is an electron micrograph of Sample No. 2 (before pulverization) shown in Tables 2 and 3. FIG. 5 is an electron micrograph of Sample No. 2 (after pulverization) shown in Tables 2 and 3. From FIGS. 2 to 5, it is revealed that each of Sample Nos. 1 and 2 has a crystal grain size before pulverization of about 10 µm, and through the pulverization, the particle diameter of each of Sample Nos. 1 and 2 becomes smaller than the crystal grain size. Moreover, it is also revealed that, in each of Sample Nos. 1 and 2, a grain boundary between crystal grains is substantially free of microcracks.

As apparent from Table 3, each of Sample Nos. 1 and 2 exhibited negative expansion while having a small particle diameter. Therefore, it is considered that a composite powder material using each of Sample Nos. 1 and 2 has a low thermal expansion coefficient, and hence the thermal expansion coefficient, of the composite powder material easily matches the thermal expansion coefficient of an object to be sealed even when a sealing thickness is small. Meanwhile, Sample No. 3 exhibited positive expansion. Therefore, it is considered that a composite powder material using Sample No. 3 has a high thermal expansion coefficient, and hence the thermal expansion coefficient of the composite powder material is difficult to match the thermal expansion coefficient of the object to be sealed when the sealing thickness is small.

It is considered that the effects exhibited by Sample Nos. 1 and 2 are observed also in combination with each of $Bi_2O_3$-based glasses shown in Table 4.

TABLE 4

| | | No. 1 | No. 2 | No. 3 | No. 4 | No. 5 | No. 6 | No. 7 | No. 8 |
|---|---|---|---|---|---|---|---|---|---|
| Glass composition (mol %) | $Bi_2O_3$ | 38.8 | 36.9 | 41.7 | 38.8 | 36.4 | 41.7 | 40.5 | 32.6 |
| | $B_2O_3$ | 23.6 | 26.9 | 26.8 | 23.6 | 26.9 | 26.8 | 28.0 | 24.3 |
| | ZnO | 12.3 | 8.9 | 9.7 | 12.3 | 8.9 | 9.7 | 28.0 | 21.3 |
| | $Al_2O_3$ | 1.8 | 1.1 | 2.4 | 1.8 | 1.1 | 2.4 | 2.8 | 0.8 |
| | CuO | 21.9 | 25.5 | 18.7 | 22.9 | 25.5 | 18.7 | 0.0 | 20.3 |
| | $Fe_2O_3$ | 0.6 | 0.7 | 0.8 | 0.6 | 0.7 | 0.8 | 0.7 | 0.6 |
| | MgO | 0.0 | 0.0 | 0.0 | 0.0 | 0.0 | 0.0 | 0.0 | 0.0 |
| | CaO | 0.0 | 0.0 | 0.0 | 0.0 | 0.5 | 0.0 | 0.0 | 0.0 |
| | SrO | 0.0 | 0.0 | 0.0 | 0.0 | 0.0 | 0.0 | 0.0 | 0.0 |
| | BaO | 1.0 | 0.0 | 0.0 | 0.0 | 0.0 | 0.0 | 0.0 | 0.0 |

REFERENCE SIGNS LIST

1 hermetic package
10 package base
11 glass cover
12 base part
13 frame part
14 internal device
15 sealing layer
L laser light

The invention claimed is:

1. A ceramic powder having precipitated therein β-eucryptite or a β-quartz solid solution as a main crystal phase, and having a negative thermal expansion coefficient in a range of from 30° C. to 300° C.,
   wherein the ceramic powder has an average particle diameter $D_{50}$ of 20 μm or less, and
   wherein the ceramic powder is substantially free of a glass phase.

2. The ceramic powder according to claim 1, wherein the ceramic powder comprises as a composition $TiO_2$ and/or $ZrO_2$.

3. The ceramic powder according to claim 1, wherein the ceramic powder comprises as a composition, in terms of mol %, 16% to 30% of $Li_2O$, 10% to 35% of $Al_2O_3$, and 30% to 68% of $SiO_2$.

4. A composite powder material, comprising a glass powder and a ceramic powder,
   wherein the ceramic powder comprises the ceramic powder of claim 1.

5. The composite powder material according to claim 4, wherein the glass powder comprises as a glass composition, in terms of mol %, 28% to 60% $Bi_2O_3$, 15% to 37% of $B_2O_3$, and 1% to 30% of ZnO.

6. A sealing material, comprising the composite powder material of claim 4.

7. A laser sealing comprising the sealing material according to claim 6.

* * * * *